United States Patent
Sohn et al.

(10) Patent No.: US 10,009,531 B1
(45) Date of Patent: Jun. 26, 2018

(54) FIELD OF VIEW EXTENDER FOR CAMERA

(71) Applicant: Amazon Technologies, Inc., Seattle, WA (US)

(72) Inventors: Jung Bae Sohn, Sunnyvale, CA (US); Leo Benedict Baldwin, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 283 days.

(21) Appl. No.: 14/855,279

(22) Filed: Sep. 15, 2015

(51) Int. Cl.
*H04N 7/00* (2011.01)
*H04N 5/225* (2006.01)
*H04N 5/232* (2006.01)
*G02B 5/04* (2006.01)

(52) U.S. Cl.
CPC ......... *H04N 5/2259* (2013.01); *G02B 5/045* (2013.01); *H04N 5/23238* (2013.01)

(58) Field of Classification Search
CPC ... H04N 5/2259; H04N 5/23238; G02B 5/045
USPC ......................................................... 348/36
See application file for complete search history.

(56) References Cited

U.S. PATENT DOCUMENTS

| | | | | |
|---|---|---|---|---|
| 2002/0080614 A1* | 6/2002 | Terada | ................. | F21V 5/02 362/328 |
| 2006/0215054 A1* | 9/2006 | Liang | ................ | G02B 3/0056 348/337 |
| 2008/0036852 A1* | 2/2008 | Toyoda | ............... | G02B 13/06 348/36 |
| 2015/0373252 A1* | 12/2015 | Georgiev | ............ | H04N 5/2259 348/349 |

OTHER PUBLICATIONS

"Review easy Cover of Canon 60D." http://www.easycover.eu/review-easycover-canon-60d-raj-27-october-2014. Oct. 27, 2014.*

* cited by examiner

*Primary Examiner* — Farzana Hossain
(74) *Attorney, Agent, or Firm* — Lee & Hayes, PLLC

(57) ABSTRACT

A field of view (FOV) extender may include prisms that direct light from an angle outside of an angle of view associated with a lens of camera, onto the image sensor of the camera, thereby piecewise extending the field of view of the camera beyond the unaltered angle of view of the camera. The prisms may be oriented to direct light around an outer region of the image sensor, which may generate signals use for motion detection purposes. Each prism may be spaced apart from an adjacent prism by a gap, which may create an alternating sequence of prisms and gaps. An inner region of the image sensor may capture imagery that may be suitable for output to a user.

20 Claims, 9 Drawing Sheets

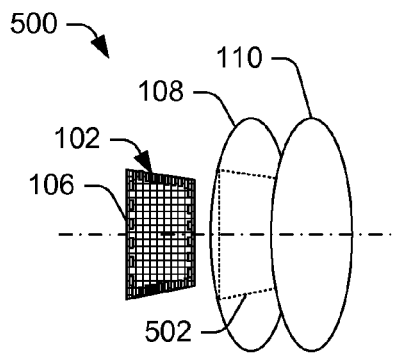
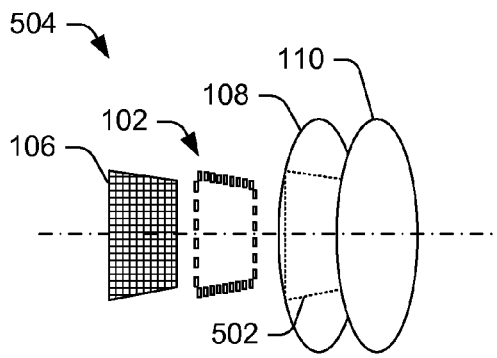
FIG. 5A  FIG. 5B
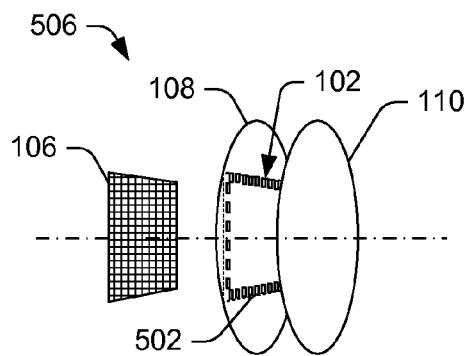
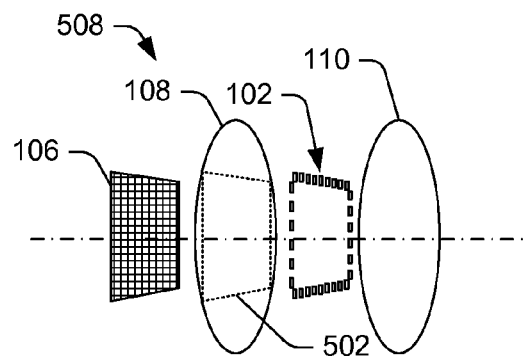
FIG. 5C  FIG. 5D
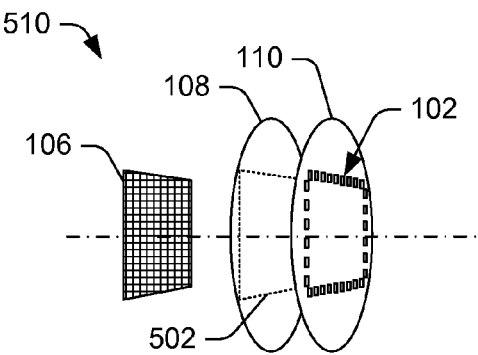
FIG. 5E

FIELD OF VIEW EXTENDER FOR CAMERA

BACKGROUND

Cameras are common included in many electronic devices including notebook computers, tablet computers, mobile telephones, and televisions. These cameras are primarily used to capture still images or video, such as during a video call or to record a personal video. Some devices include multiple cameras, such as a forward facing camera (that faces a user operating the device) and a rear facing camera often located on a side opposite of the device with respect to the forward facing camera. Often, the forward facing camera is a lower quality camera intended to capture low to medium quality images, while the rear facing camera is of greater quality and intended to capture medium to high quality images. These cameras often have a mid-range angle of view, which capture imagery across about a 60-75 degree range horizontally. Wider angle cameras are often cost-prohibitive on these multi-use devices and are instead typically used primarily on devices dedicated for capturing imagery, such as single-lens reflex (SLR) cameras, and/or as add-ons for existing cameras.

Some cameras or imaging devices (e.g., proximity sensors, etc.) are designed for detecting motion. Often, these devices have a field of view greater than 75 degrees, and upwards of 180 degrees. However, these devices often either lack the resolution of the comparable cameras included on electronic devices (as discussed above) or are cost prohibitive due to expensive wide angle lenses.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 5A-5E show schematic diagrams of various configurations of the image sensor, FOV extender, lens, and protective layer.

DETAILED DESCRIPTION

Figure 1A:
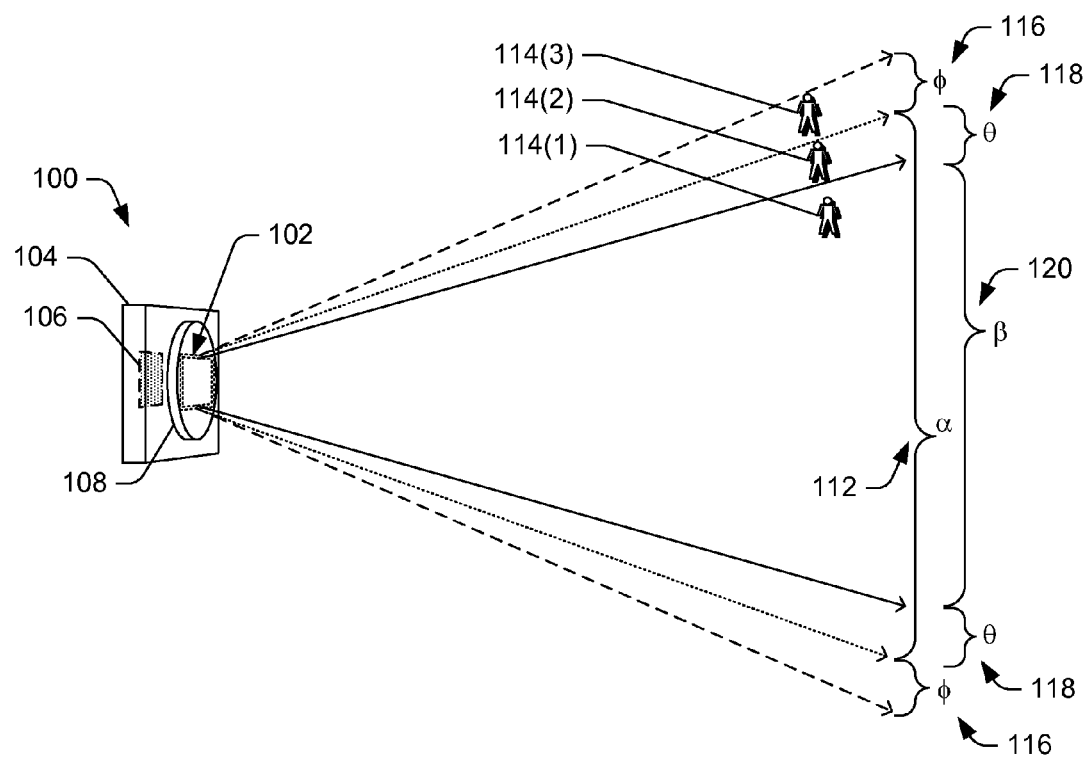
FIG. 1A is a schematic diagram of a camera configured with an illustrative field of view (FOV) extender that extends a field of view of imagery captured by a perimeter of an image sensor.

This disclosure is directed to a field of view (FOV) extender device for use with a camera. The FOV extender may include prisms that direct light from an angle outside of an angle of view associated with the camera, onto the image sensor of the camera, thereby piecewise extending the field of view of the camera beyond the unaltered angle of view of the camera. The prisms may be oriented to direct light around an outer boundary of the image sensor, which may generate signals use for motion detection purposes.

The camera may be small or micro-camera integrated in an electronic device such as a tablet computer or mobile telephone. The camera may include an image sensor, a lens, and protective layer to protect the lens. The lens may be associated with an angle of view (typically 60-75 degrees horizontal), and shaped to direct light toward the image sensor.

In some embodiments, the FOV extender may be implemented as an array of prisms. The prisms may refract light by a predetermined angle. The array of prisms may include a first group of prisms arranged as a first column along a first outer edge of a rectangular plane and arranged as a second column along a second outer edge of the rectangular plane. The rectangle plane may be oriented parallel to the image sensor and may intersect the light directed by the lens toward the image sensor. In some embodiments, rows of prisms may be arranged across a third and fourth outer edge of the rectangular plane, thereby creating a border around the outer edge of the rectangle plane.

Each prism may be spaced apart from an adjacent prism by a gap, which may create an alternating sequence of prisms and gaps. The gaps permit light to reach the sensor without a change in angle (e.g., refraction) caused by the prisms, whereas the prisms change the angle of light by the predetermined angle due to refraction. The light refracted by the prisms may cause an outer perimeter of the image sensor to capture light from an extended field of view without compromising a capture of imagery by the inner portion of the image sensor. Thus, the inner portion of the image sensor may capture imagery, which when cropped to exclude image data influenced by the prisms, may be suitable for output to a user.

The inner portion of the image sensor may include a majority of the image sensor's surface area, in some embodiments. As an example, the camera may have a 70 degree angle of view prior to use of the FOV extender. The prisms may redirect light from 5 degrees horizontally on each side of the image sensor. Thus, the unaltered angle of view of the image sensor may be 60 degrees. The prisms may refract light by 5 degrees. Thus, the full angle of view of the camera that includes the FOV extender results in 80 degrees, but the imagery in the outer 10 degrees of each side includes some "holes" where some light from the 60-80 degrees angle of view is not captured by the image sensor. However, imagery captured by the image sensor in this portion of the image sensor may be useful for motion detection and computer vision, as well as for other uses. Although the prisms in this example refract light by 5 degrees, other angles may be used. Of course, larger angles may potentially result in loss of image quality of captured imagery (e.g., dispersion through the prism).

The FOV extender may be added to an existing camera, such as by coupling the FOV extender to a camera from an original equipment manufacturer (OEM) or off-the-shelf camera. For example, the FOV extender may be coupled to a protective cover that is placed over the lens of the camera. The FOV extender may be created using injection molded plastic or glass, for example. In some embodiments, the FOV extender may be formed as part of the camera, and the FOV extender may be placed on the image sensor, on the lens, on a protective cover, and/or between components of the camera.

The apparatuses, systems, and techniques described herein may be implemented in a number of ways. Example implementations are provided below with reference to the following figures.

FIG. 1A is a schematic diagram of a camera 100 configured with an illustrative field of view (FOV) extender 102 that extends a field of view of imagery captured by an area of an image sensor near a perimeter of the image sensor. The camera 100 may include a housing 104 that couples together at least an image sensor 106, a lens 108, and a protective layer 110. The camera 100 may be an off-the-shelf small or micro-camera commonly used in mobile telephones, tablets, notebook computers, video conferencing devices, and/or other computing devices. The camera 100 may use a fixed-focus lens and a small sensor to maintain a relatively compact size (e.g., small stack and small footprint) for the housing 104 to accommodate use in a mobile device. The camera 100 may lack a physical shutter and other components often used in larger cameras, such as single-reflex (SLR) lens cameras. The lens 108 may be a plastic or glass lens which directs light onto the image sensor 106. The image sensor 106 may generate signals in response to the light from the lens 108. The protective layer 110 may be used to protect the lens from damage, prevent collection of dust or other particles around the lens 108, and/or secure the lens to the housing. In some embodiments, the protective layer 110 may be applied or coupled to the camera as part of a main device assembly, where the camera is a sub-component of the main device (e.g., a mobile phone, a tablet computer, a notebook computer, a teleconferencing device, etc.). Thus, the camera may not include the protective layer 110 or a final assembly may include multiple protective layers.

The lens 108 may be associated with an angle α of view 112. For example, common lenses for these types of small cameras have an angle of view of about 60-75 degrees horizontal. When the camera 100 is used to capture imagery without use of the FOV extender 102, the image sensor may capture imagery and generate signals that represent objects 114(1) and 114(2). However, in this example, an object 114(3) is outside of the angle α of view 112, and would not be captured, through the lens 108, by the image sensor 106 without use of the FOV extender 102. As used herein, the term "angle of view" is used to describe an angle associated with unaltered light traveling through a lens, and in FIG. 1, shown as angle α 112.

Figure 4A:
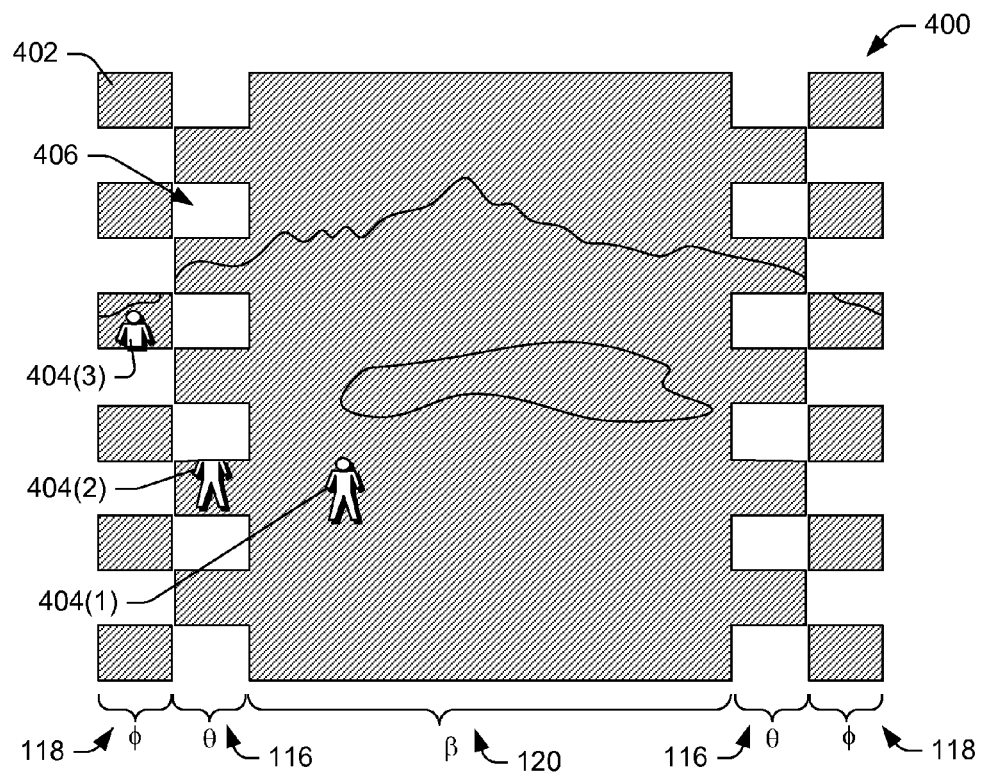
FIG. 4A is a schematic diagram that shows an illustrative spatial representation of imagery captured by the image sensor after light travels through the FOV extender.
Figure 4B:
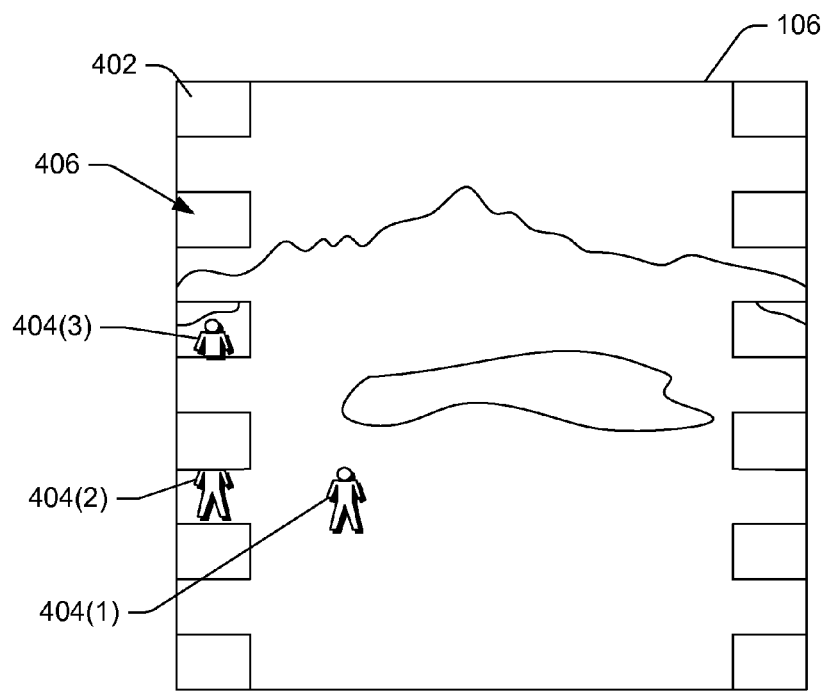
FIG. 4B is a schematic diagram of an image sensor that shows the imagery captured corresponding to the spatial representation shown in FIG. 4A.

In contrast, the term "field of view" is used herein to describe an angle associated with imagery captured by the image sensor 106 using the lens 108 and the FOV extender 102. In FIG. 1, the field of view present when the FOV is used is shown as angle α+2φ, where capture of light with an angle φ 116 is caused by refraction of light by one or more prisms in the FOV extender 102. The FOV extender 102 may redirect light by refraction to cause the light to travel through the lens or redirect light from the lens (depending on the location of the FOV extender 102 relative to the lens), to create a wider view than the angle α of view 112. To achieve this additional angle, prisms in the FOV extender 102 may refract light to enable the image sensor 106 to capture imagery from within the angle φ 116, which may enable capture of imagery of the object 114(3). However, in order to capture this additional imagery, some imagery from within an angle θ 118 may be redirected, and thus not captured by the image sensor 106 as explained in further detail below. Depending on placement of the prisms and gaps between the prisms, the image sensor 106 may capture imagery from some portions of the angle φ 116 (due to refraction by prisms) and some portions of the angle θ 118 (due to gaps between the prisms). Thus the outer perimeter of the image sensor 106 may capture a "patch-work" of image data associated with different angles, such as alternating between angles φ, θ, φ, θ, φ . . . and so forth. To further illustrate this result, the object 114(3) (e.g., a person) may be partially captured such that an algorithm processing signals from the image sensor may detect that presence of the person, but may not have complete enough imagery to identify the specific person due to missing portions of the imagery of the person. This is illustrated in FIGS. 4A and 4B.

In accordance with various embodiments, an angle β 120 of view may be captured in whole by the image sensor without the light being redirected by the prisms for this corresponding inner portion of the image sensor. Thus, the imagery captured by the image sensor 106 from within the angle β 120 may be stored as user-facing data that can be presented to a user, such as by display or storage of a picture or other image, since this data does not include the "patch-work" data discussed above. In contrast, the imagery captured by the image sensor from the range outside of the angle β 120 (within φ and θ) may be used for motion detection or other purposes, but may not be user-facing and displayed as part of a typical picture or image.

Figure 1B:
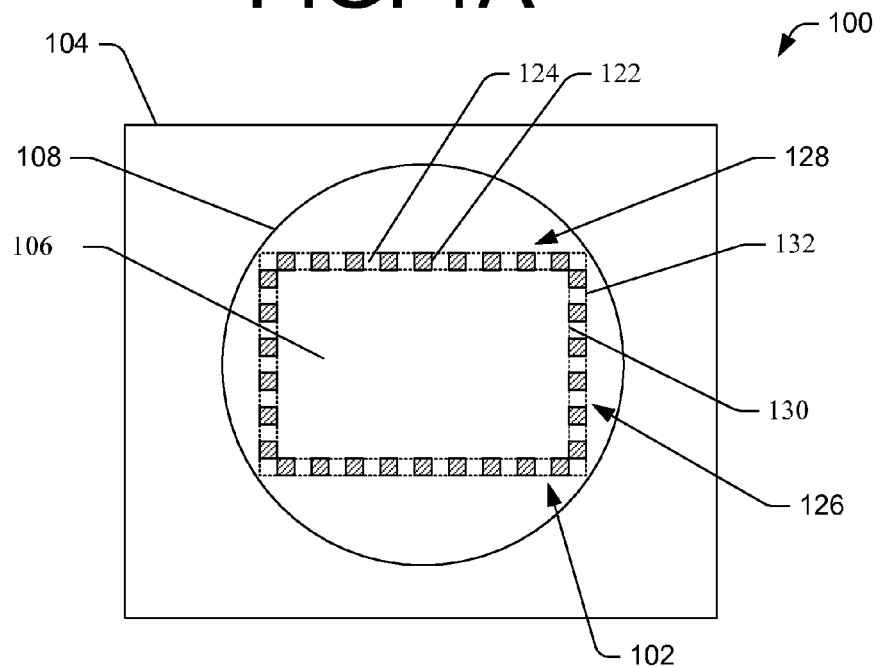
FIG. 1B is a schematic diagram of the camera that includes the FOV extender oriented in relation to a lens and image sensor shown in FIG. 1A.

FIG. 1B is a schematic diagram of the camera 100 that includes the FOV extender oriented in relation to a lens and image sensor shown in FIG. 1A. The schematic diagram represents a front elevation view of the camera 100 with the lens 108 facing outward. As shown in FIG. 2B, the FOV extender 102 includes prisms 122 separated by gaps 124. In some embodiments, the width (and/or height) of the gap may be equal or nearly equal to the width (and/or height) of the prism. The prisms may be arranged as an array of prisms in a column arrangement 126 and/or a row arrangement 128. A footprint from the prisms 122 and the gaps 124 may span between an inner perimeter 130 and an outer perimeter 132 of the image sensor 106, which define an outer region of the image sensor that may be receive light refracted by the prisms. The outer region may include up to half of a total surface area of the image sensor. In some embodiments, the outer region may include an area equal to a different between a 16:9 display and a 4:3 display, which is about a third of the total surface area of the image sensor. An area inside of the inner perimeter 130, which is associated with an area of the image sensor 106, may capture the angle β of view 120 as discussed above. An area between the inner perimeter 130 and the outer perimeter 132, which causes the image sensor 106 to receive light through the gap 124 and unaltered by the prism 122, may capture light within the angle θ 118 as discussed above. An area between the inner perimeter 130 and the outer perimeter 132, which causes the image sensor 106 to receive light altered by the prism 122, may capture light within the angle φ 116 as discussed above.

Figure 2:
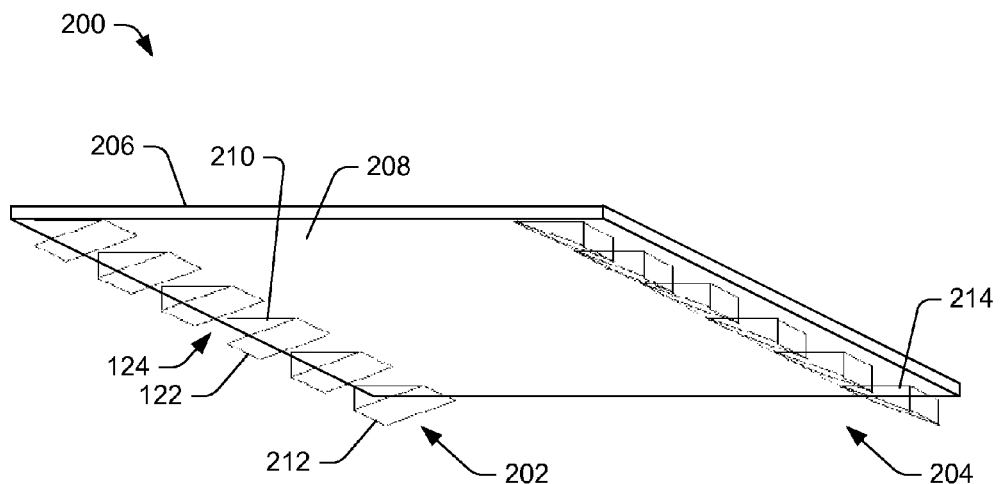
FIG. 2 is a side elevation perspective view of the FOV extender.

FIG. 2 is a side elevation perspective view of an illustrative FOV extender 200. The FOV extender includes the prisms 122 spaced apart by the gaps 124. The FOV extender 200 may include two arrangements of prisms (rows, columns, or both). For discussion purposes, the arrangements are referred to as columns. As shown in FIG. 2, the FOV extender 200 may be arranged in a first column of prisms 202 and a second column of prisms 204. The prisms may be coupled to a layer 206. The layer 206 may be the protective layer 110 that covers the lens 108 or an intermediate layer. In some embodiments, the prisms 122 may be coupled to the lens 108 or the image sensor 106. The prisms 122 may be formed of plastic, glass, or other transparent materials that cause refraction of light without significant loss of light. In some embodiments, the prisms 122 may be formed by injection molding and may be integrally formed on or with the layer 206. The prisms may be glued or otherwise adhered to the layer 106 (or another surface) using optical cement or equivalents. In some embodiments, the prisms may be coupled to a frame that creates structural support and orients the prisms in space. The frame may be outside the view of the image sensor when configured for use with a camera, while locating the prism within the field of view of the image sensor. The frame, therefore, may be formed of a same material as the prisms or a different material. The frame may include an aperture that enables light to pass unaltered through the aperture of the frame and onto the image sensor.

The layer 206 may include a rectangular plane 208, of which a first surface 210 of the prism is aligned in parallel. The rectangular plane may be oriented parallel or substantially parallel to the image sensor and may intersect light directed by the lens toward the image sensor. Thus, the shape and size of the rectangular plane 208 is determined in part by the location of the prisms with respect to the lens and image sensor, as well as the size and shape of the lens and image sensor.

The prisms arranged in the first column 202 may be a mirror image of the prisms arranged in the second column 204. For example, a prism 212 may be identical to a prism 214. The prism 212 may be oriented 180 degrees with respect to the prism 214, where the 180 degrees rotation is about an axis that is perpendicular to the rectangular plane 208.

Figure 3:
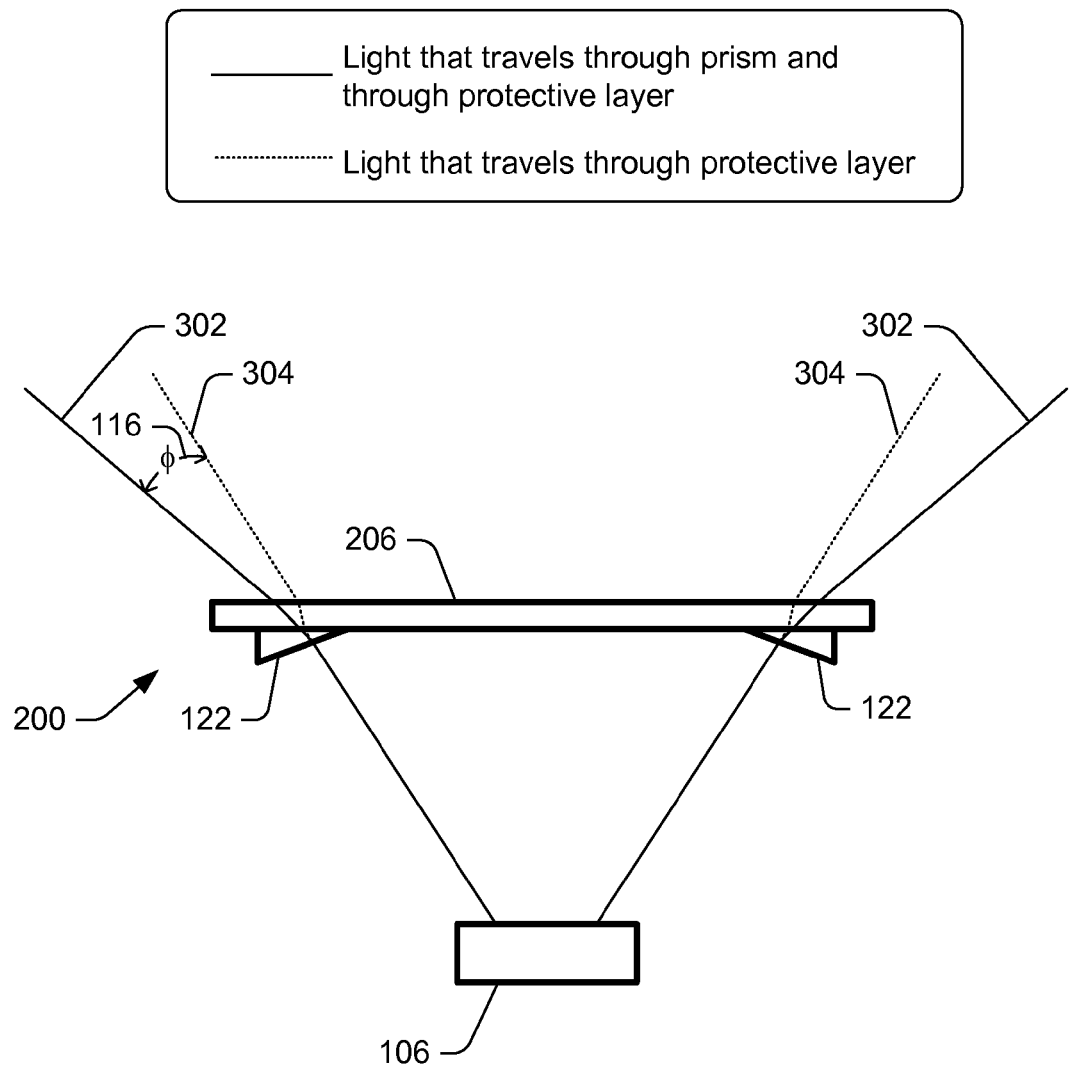
FIG. 3 is a side elevation view showing the illustrative FOV extender shown in FIG. 2

FIG. 3 is a side elevation view showing the illustrative FOV extender 200 shown in FIG. 2. FIG. 3 illustrates refraction of light by the FOV extender 200. As shown in FIG. 3, first light 302 travels through the prism 122 of the FOV extender 200 and the layer 206 while second light 304 travels past the prism 122 through a gap and through the layer 206. As shown, the first light is refracted by the prism 122 and the layer 206, and include an angular change in direction of the angle φ 116, which is the angle of deviation. In contrast, the second light 304 includes no angle of deviation because the angle of the incident ray of light entering a first surface of the layer and the angle of the refracted ray that emerges from the second surface of the layer 206 are the same angle.

FIG. 4A is a schematic diagram that shows an example spatial representation of illustrative imagery 400 captured by an image sensor after light travels through the FOV extender 200. The imagery 400 may be captured by the image sensor 106 shown in FIG. 4B, which may be a rectangular image sensor. However, the spatial representation of the imagery 400 shows spatial offsets 402 that correspond to and are caused by the prisms (e.g., the prisms 122) of the FOV extender, such as the FOV extender 200 shown in FIGS. 2 and 3. Thus, the image sensor captures light from an area of the spatial offset. Objects 404(1), 404(2), and 404(3) correspond respectively to the objects 114(1), 114(2), and 114(3) shown in FIG. 1A. As shown in FIG. 4A, the spatial offsets 402 may represent light captured from within the angle φ 116. Meanwhile, spatial gaps 406 may exist adjacent to the spatial offsets 402 due to the refraction of the light by the prisms. The spatial gaps 406 may represent light captured from within the angle θ 118. Thus, the spatial area represented by the spatial offsets 402 and the spatial gaps 406 may create the patch-work of imagery that may not be ideal for user-facing outputs, but may be suitable or useful for motion detection and other tasks that benefit from wide angle views of an environment.

FIG. 4B shows the imagery captured by the image sensor 106 which corresponds to the spatial representation shown in FIG. 4A. Since the image sensor 106 is typically rectangular, the spatial representation is confined within the perimeter of the image sensor 106. The surface area of the prisms, the spacing of the prisms, and the refraction angles associated with the prisms may not be uniform across all prisms. For example, some of the prisms may refract light at a greater angle to provide a wider view than other prisms. By using different prisms having different angles of refraction, the spatial representation shown in FIG. 4A may be extended further outward, but may include more "holes" where imagery from the environment is not captured by the image sensor.

FIG. 5A-5E are schematic diagrams of various configurations showing an approximate location of the FOV extender 102 in relation to the image sensor 106, the lens 108, and the protective layer 110.

FIG. 5A shows a first configuration 500 that includes the FOV extender 102 on or proximate to the image sensor 106, and in relation to the lens 108 and the protective layer 110. The lens 108 shows a rectangle 502 that corresponds to a general shape of the image sensor 106. The rectangle 502 is shown for discussion purposes. The FOV extender 102 may be located on or proximate to the image sensor 106, which is in focus by design of the camera. In some embodiments, individual prisms (e.g., the prism 122) may be coupled to the image sensor along one or more pixels. In some embodiments, a prism may be sized to cover a predetermined number of pixels of the image sensor, such as one pixel, ten pixels, a hundred pixels, or any other quantity of pixels. In various embodiments, the FOV extender 102 may be located proximate to but not on the image sensor 106. For example, the layer 206, which includes the coupled prisms (shown in FIG. 2), may be located proximate to the image sensor 106 such as by a housing that securely locates components of the camera.

FIG. 5B shows a second configuration 504 that includes the FOV extender 102 located between the image sensor 106 and the lens 108. The layer 206, which includes the coupled prisms (shown in FIG. 2), may be located between the image sensor 106 and the lens 108 such as by a housing that securely locates components of the camera.

FIG. 5C shows a third configuration 506 that includes the FOV extender 102 on or proximate to the lens 108. In some embodiments, individual prisms (e.g., the prism 122) may be coupled to the lens 108. In various embodiments, the FOV extender 102 may be located proximate to but not on the lens 108. For example, the layer 206, which includes the coupled prisms (shown in FIG. 2), may be located proximate to the lens 108 such as by a housing that securely locates components of the camera. In accordance with one or more embodiments, the prisms may be integrally formed in the lens 108, such as by an injection molding processes. The prisms may be adhered or coupled to the lens 108 using optical cement or other equivalents.

FIG. 5D shows a fourth configuration 508 that includes the FOV extender 102 located between the lens 108 and the protective layer 110. The layer 206, which includes the coupled prisms (shown in FIG. 2), may be located between the lens 108 and protective layer 110 such as by a housing that securely locates components of the camera.

FIG. 5E shows a fifth configuration 510 that includes the FOV extender 102 on or proximate to the protective layer 110. In some embodiments, individual prisms (e.g., the prism 122) may be coupled to the protective layer 110. In various embodiments, the FOV extender 102 may be located proximate to but not on the protective layer 110. For example, the layer 206, which includes the coupled prisms (shown in FIG. 2), may be located proximate to the protective layer 110 such as by a housing that securely locates components of the camera. In accordance with one or more embodiments, the prisms may be integrally formed in the protective layer 110, such as by an injection molding processes. The prisms may be adhered or coupled to the protective layer 110 using optical cement or other equivalents.

Figure 6A:
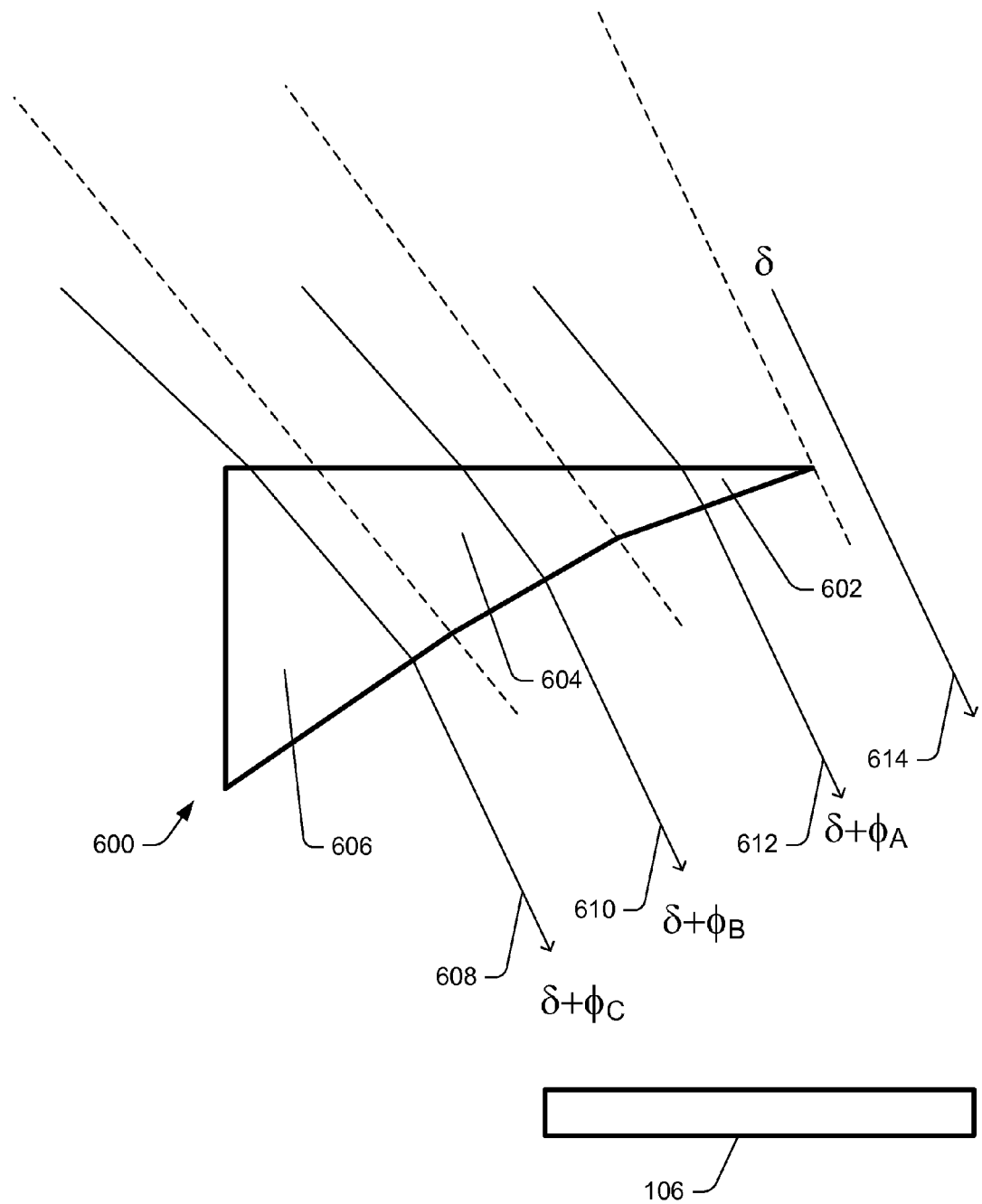
FIG. 6A is a schematic diagram of an illustrative polyhedron prism that includes at least two different hypotenuse surfaces that refract light at different angles.

FIG. 6A is a schematic diagram of an illustrative polyhedron prism 600 that may be used by the FOV extender, and that includes at least two different hypotenuse surfaces that refract light at different angles. The polyhedron prism 600 may enable spreading an angle of light subjected to the prism (and thus to the FOV extender) over a greater angle $\hat{\phi}$, while the angle associated with a gap (e.g., the gap 124) remains as angle $\theta$. Thus, $\hat{\phi}$ is greater than $\phi$. As an example, $\theta$ may be equal to 5 degrees. The polyhedron prism 600 may include portions that refract light by 5 degrees ($\phi_A$), by 7.5 degrees ($\phi_B$), and by 10 degrees ($\phi_C$) across the various portions of the polyhedron prism 600. However, the incremental angle deviations do not have to be equivalent, such as the incremental deviation of 2.5 degrees in the example above. Thus, the angle deviations could be 5, 8, and 13 degrees, for example. In some embodiments, the polyhedron prism 600 may have many hypotenuse surfaces, which may recreate or replicate a curved surface.

As shown in FIG. 6A, the polyhedron prism 600 may include a first portion 602 which causes a first refraction of $\phi_A$, a second portion 604 which causes a second refraction of $\phi_B$, and a third portion 606 which causes a third refraction of $\phi_C$. Although three portions are shown, any number of portions may be used. Each portion may be a separate prism, possibly combined to create the polyhedron prism 600. However, the polyhedron prism 600 may be integrally formed with different hypotenuse angles. The angle of light may is represented as $\delta$ in FIG. 6A. Thus, third light 608 entering the third portion 606 of the polyhedron prism 600 may enter at an angle $\delta$ and be refracted to an angle $\delta+\phi_C$. Second light 610 entering the second portion 604 of the polyhedron prism 600 may enter at the angle $\delta$ and be refracted to an angle $\delta+\phi_B$. First light 612 entering the first portion 602 of the polyhedron prism 600 may enter at the angle $\delta$ and be refracted to an angle $\delta+\phi_A$. For reference, light 614 may not travel through the polyhedron prism 600 and may continue at the angle $\delta$ toward the image sensor 106.

Figure 6B:
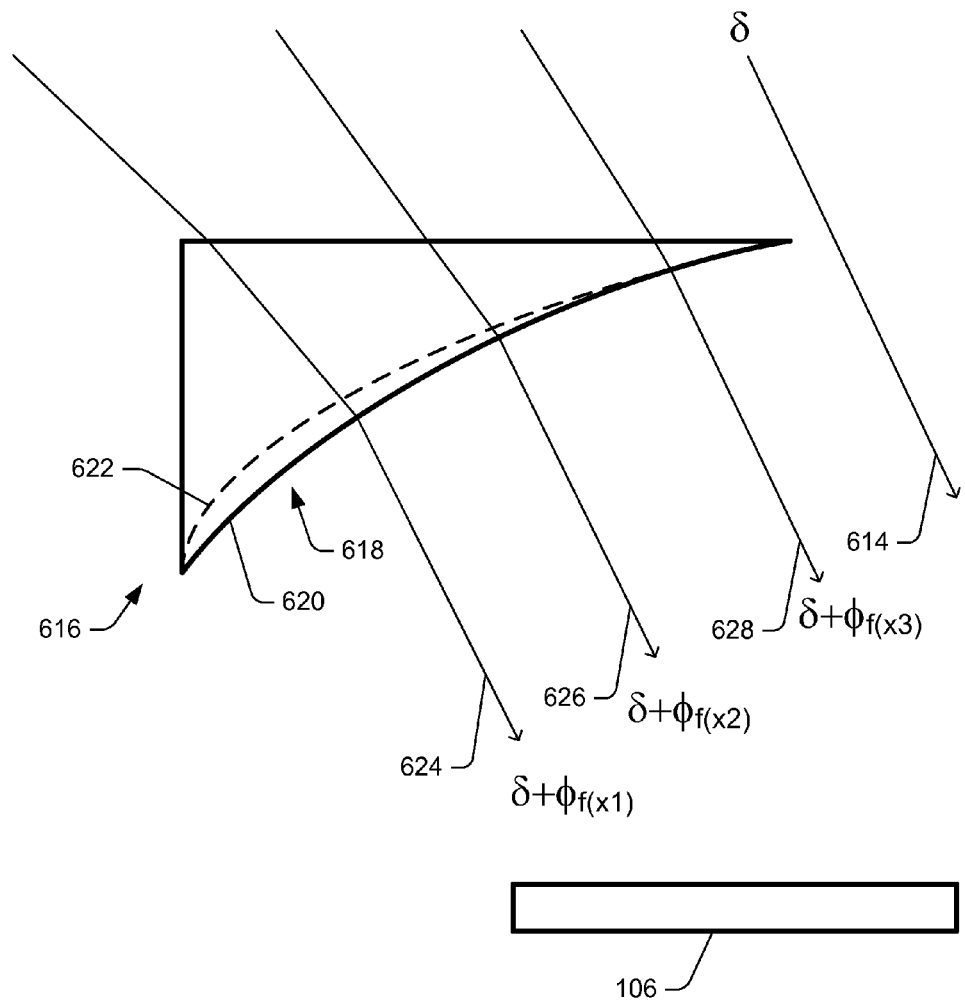
FIG. 6B is a schematic diagram of an illustrative prism that includes a curved hypotenuse surface that refracts light at different angles.

FIG. 6B is a schematic diagram of an illustrative prism 616 that includes a curved hypotenuse surface 618 that refracts light at different angles. In some embodiments, the curved hypotenuse surface 618 may have a fixed curvature 620 defined by a fixed radius. In various embodiments, the curved hypotenuse surface 618 may have a variable curvature 622 without a fixed radius, which may increasingly stretch out a field of view captured by the image sensor as light travels nearer to the edge of the lens proximate to the perimeter of the lens. As shown in FIG. 6B, the curved hypotenuse surface 618 may be a concave surface, such as when the prism 616 is configured for placement as shown and described with reference to FIG. 2. However, the prism may be configured with a convex surface as the curved hypotenuse surface 618, such as when the prism is inverted and place on an opposite side of the mounting surface or feature. A resultant image generated from light that travels through the prism 616 would be anamorphic on the sides, and thus people depicted from this region would look slim in the raw image. This portion of the image may be trimmed or removed prior to providing imagery to the user, as discussed above.

The angle of light may is represented as $\delta$ in FIG. 6B. First light 624 entering the prism 616 at a first location along the curved hypotenuse surface 618 may enter at an angle $\delta$ and be refracted to an angle $\delta+\phi_{f(x1)}$, where f(x) is a function describing the curvature of the curved hypotenuse surface 618. Second light 626 entering the prism 616 at a second location along the curved hypotenuse surface 618 may enter at the angle $\delta$ and be refracted to an angle $\delta+\phi_{f(x2)}$. Third light 628 entering the prism 616 at a third location along the curved hypotenuse surface 618 may enter at the angle $\delta$ and be refracted to an angle $\delta+\phi_{f(x3)}$. For reference, the light 614 may not travel through the prism 616 and may continue at the angle $\delta$ toward the image sensor 106.

In some embodiments, the prism 616 may be implemented as a continuous or partially continuous strip that may span part of or all of a side or perimeter of the FOV extender. Thus, the prism 616 may be implemented as shown in FIG. 2 or may be a long continuous prism.

Figure 7:
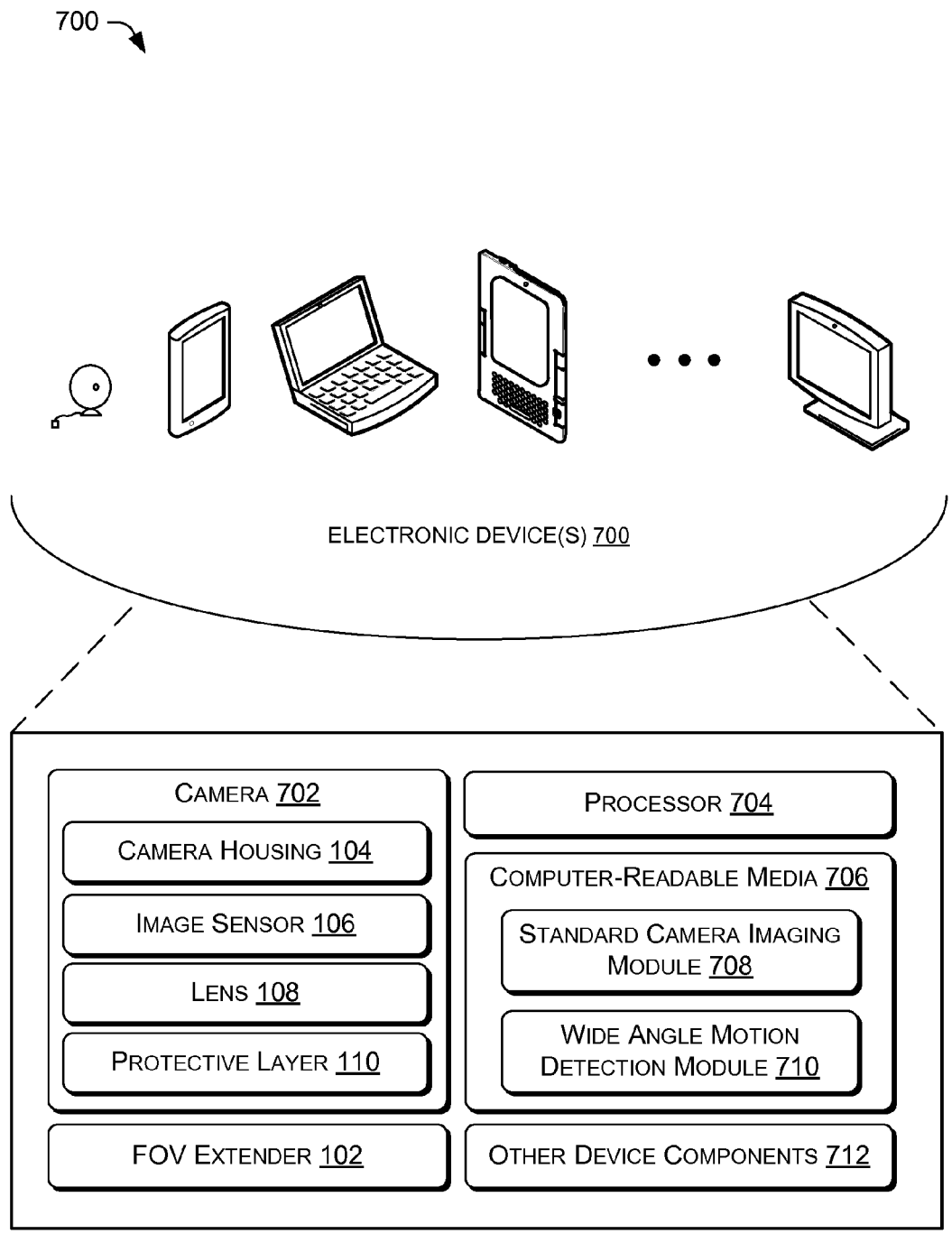
FIG. 7 is a schematic diagram of an illustrative device that includes a camera and the illustrative FOV extender.

FIG. 7 is a schematic diagram of an illustrative device 700 that includes a camera and the illustrative FOV extender. The device may include a camera 702, which may be an off-the-shelf camera or custom designed and manufactured camera for a mobile electronic device or other electronic device. The camera may include a fixed-focus. The camera may include the housing 104, the image sensor 106, the lens 108 and the protective layer 110, or any combination thereof but possibly not all of these components, each described above. The device 700 may include the FOV extender 102, which may be located in any of the locations described above with respect to FIGS. 5A-5E. The FOV extender 102 may be added to an existing camera (e.g., an off the shelf camera, OEM camera, etc.), or may be custom built for inclusion in a custom camera. An example of a custom camera may be represented in FIG. 5A. An example of a modification to an existing camera may be represented in FIG. 5E.

The device 700 may include one or more processors 704 and one or more computer readable media 706 that stores various modules, applications, programs, or other data. The computer-readable media 706 may include instructions that, when executed by the one or more processors 704, cause the processors to perform the operations described herein.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/ machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 706 may store a standard camera imaging module 708 and a wide angle motion detection module 710, which are described in turn. The components may be stored together or in a distributed arrangement. For example, the component may be stored on different devices, and possibly on remote devices (e.g., cloud service providers).

The standard camera imaging module 708 may utilize the signals of the image sensor 106 that correspond to light captured within the angle β 120 as shown in FIGS. 1A and 4A. This angle of view represents imagery captured in a rectangular format from light that does not pass through the prisms of the FOV extender 102. This imagery may be suitable for display to a user, such as for capturing, displaying, and storing pictures and videos for the user.

The wide angle motion detection module 710 may utilize the signals of the image sensor that correspond to the angles φ and θ as shown in FIGS. 1A and 4A. These angles of view may be a patch-work that covers a wide angle view of an environment, and may be used by to detect motion by the wide angle motion detection module 710. In some embodiments, the wide angle motion detection module 710 may be trained to detect motion in this region where light is captured from within angles φ and θ and/or identify objects associated with motion. For example, the wide angle motion detection module 710 may be trained to identify a human, different animals, non-living objects, and so forth, such as to enable the wide angle motion detection module 710 to distinguish between movement of a person and movement of window blinds due to a gust of wind through a window, for example. In some embodiments, the wide angle motion detection module 710 may also use the signals of the image sensor 106 that correspond to the angle β for motion detection and/or object identification purposes.

In various embodiments, the wide angle motion detection module 710 may operate in a low power state, such as by collecting and/or analyzing frames at a first frame rate that is less frequent than a second frame rate. In response to detection of a trigger, such as detection of a moving person, moving living being, and/or other moving object, the wide angle motion detection module 710 may trigger the standard camera imaging module 708 to operate at the second frame rate and to capture images. Thus, the wide angle motion detection module 710 may operate in some implementations as an early warning motion system that initiates use of the standard camera imaging module 708 in response to certain predetermined trigger events (e.g., detection of motion or motion of particular objects or classes of objects).

The device 700 may include other device components 712, such as communication interfaces (e.g., wired or wireless network adapters, etc.), displays, input devices, output devices, and so forth.

Figure 8:
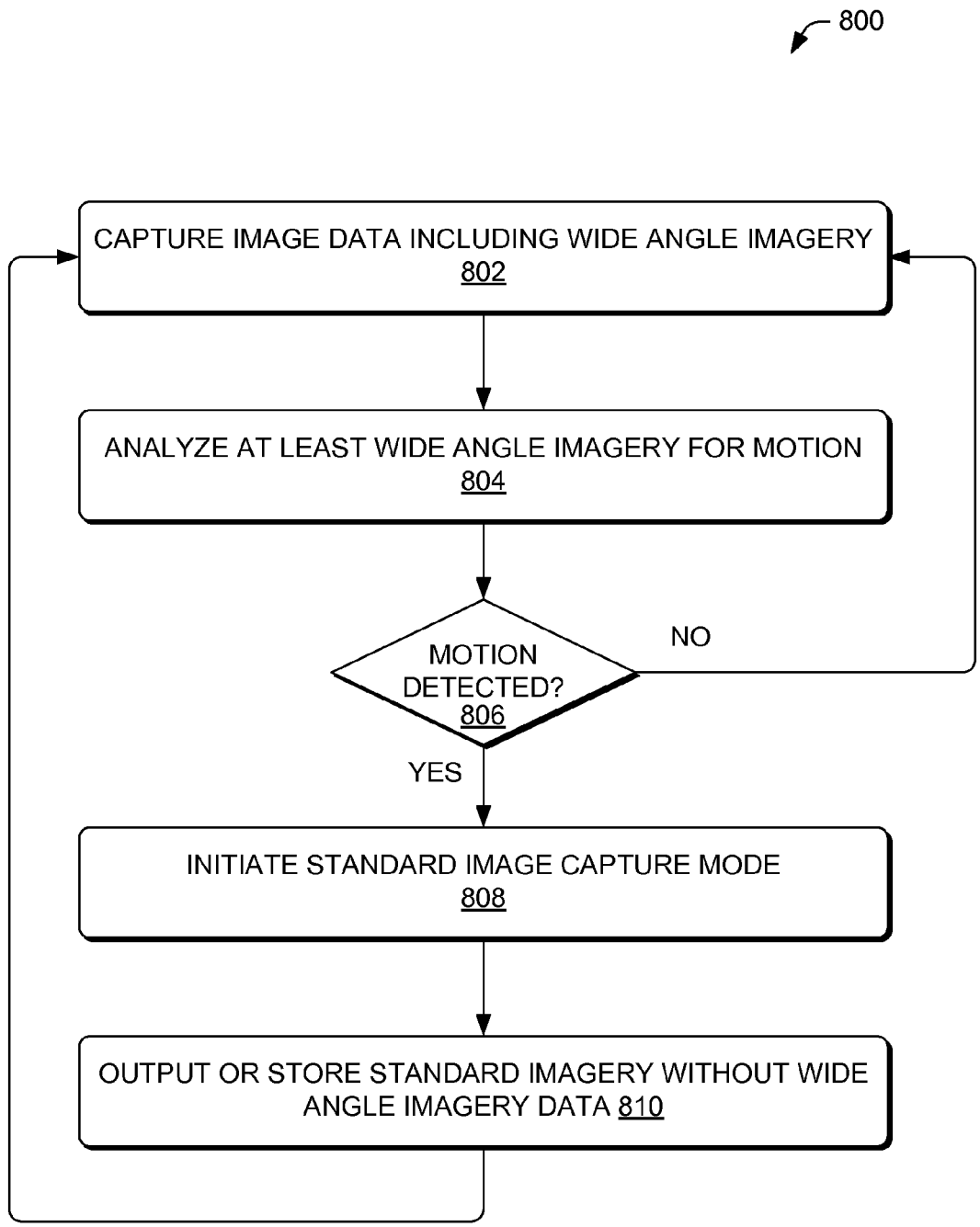
FIG. 8 is a flow diagram of an illustrative process to analyze imagery captured via the FOV extender and determine whether motion is detected in the imagery.

FIG. 8 is a flow diagram of an illustrative process 800 to analyze imagery captured via the FOV extender and determine whether motion is detected in the imagery. The process 800 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The process 800 is described with reference to the preceding figures, and may be performed by the device 700 using the standard camera imaging module 708 and/or the wide angle motion detection module 710.

At 802, the image sensor 106 may capture light and create image data including wide angle imagery caused by the refraction of light by the FOV extender 102. The image sensor 106 may convert the light to signals, which may be immediately analyzed and/or stored, at least temporary, for later use.

At 804, the wide angle motion detection module 710 may analyze at least the wide angle imagery captured by the image sensor 106 caused by the refraction of light by the FOV extender 102. The wide angle motion detection module 710 may analyze all image data captured in some embodiments, or may limit analysis to portions of image data, such as portions of image data that corresponds to light captured from within the angles φ and θ shown in FIGS. 1A and 4A. In some embodiments, the analysis may occur in a low power state and/or using imagery from a first frame rate that is less frequent than a second frame rate. The analysis may include motion detection and/or object detection/classification, as discussed above.

At 806, the wide angle motion detection module 710 may determine whether motion is detected or another predetermined criteria is satisfied, such as motion by a particular type of object (e.g., a person, etc.). When the motion is not detected or other criteria is not satisfied (following the route "no"), then the process 800 may advance to the operation 802 and continue accordingly. When the motion is detected or the other criteria is satisfied (following the route "yes"), then the process 800 may advance to the operation 808 and continue accordingly.

At 808, the wide angle motion detection module 710 may cause initiation of a standard image capture mode. For example, the wide angle motion detection module 710 may cause the standard camera imaging module 708 to perform operations to capture standard imagery. In some embodiments, the operation 808 may cause the device to change a power state, such as "awake" or otherwise transition from a lower power state to a higher power state. In various embodiments, a frame rate used at the operation 802 may be a first frame rate and a frame rate initiated at the operation 808 may be a second frame rate that is more frequent than the first frame rate.

At 810, the standard camera imaging module 708 may output or store standard imagery that excludes the wide angle imagery that corresponds to light captured from within the angles φ and θ shown in FIGS. 1A and 4A, but instead is limited to portions where light is captured within the angle β shown in FIGS. 1A and 4A. The standard imagery may be suitable for display to users and for other presentation purposes, whereas the imagery that corresponds light captured from within the angles φ and θ may not be suitable for display to users or for other presentation purposes.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A camera comprising:
   a housing;
   an image sensor secured within the housing, the image sensor including an outer region located proximate to a perimeter of the image sensor, the outer region to capture light associated with an extended field of view of an environment;
   a lens coupled to a side of the housing, the lens associated with an angle of view and positioned to direct light toward the image sensor;
   a protective transparent layer coupled to at least one of the lens or the housing and located adjacent to an outward-facing surface of the lens with respect to image sensor; and
   a field of view (FOV) extender coupled to at least one of the protective transparent layer or the housing, the FOV extender comprising an array of prisms arranged as a first column along a first outer edge of a rectangular plane and arranged as a second column along a second outer edge of the rectangular plane, wherein:
      the rectangular plane is oriented substantially parallel to the image sensor and intersects the light directed by the lens toward the image sensor,
      a first prism of the array of prisms is laterally separated from a second, adjacent prism of the array of prisms by a gap that is at least approximately equal to a width of the first prism, the gap permitting light to pass by the array of prisms and onto the outer region of the image sensor,
      the first prism and the second prism are shaped to direct light, from an angle outside of the angle of view associated with the lens, onto the outer region of the image sensor, and
      at least a first surface of the first prism and a second surface of the second prism are parallel to the rectangular plane.

2. The camera as recited in claim 1, wherein the first prism and the second prism cause refraction of light that is directed onto the outer region of the image sensor, the outer region comprising up to half of a total surface area of the image sensor.

3. The camera as recited in claim 1, wherein the array of prisms is further arranged as a first row along a third outer edge of the rectangular plane and arranged as a second row along a fourth outer edge of the rectangular plane.

4. The camera as recited in claim 1, wherein the array of prisms arranged as the first column is oriented 180 degrees, about an axis perpendicular to the rectangular plane, with respect to the array of prisms arranged as the second column.

5. An apparatus comprising:
   a field of view (FOV) extender configured to couple to at least one of a lens or a housing of a camera, the FOV extender comprising an array of prisms arranged as a first column of prisms along a first outer edge of a rectangular plane and arranged as a second column of prisms along a second outer edge of the rectangular plane, the array of prisms to direct light from an angle outside of an angle of view associated with the lens toward an outer region of an image sensor proximate to a perimeter of the image sensor, wherein adjacent prisms in the array of prisms are spaced apart from each other by a gap, and wherein at least a first surface of a first prism of the array of prisms and a second surface of a second prism of the array of prism are parallel to the rectangular plane.

6. The apparatus as recited in claim 5, wherein the image sensor captures first light, in the outer region, that travels through the gaps, the first light corresponding to an object that is within the angle of view.

7. The apparatus as recited in claim 5, wherein the rectangular plane is oriented substantially parallel to the image sensor and intersects the light directed by the lens toward the image sensor.

8. The apparatus as recited in claim 5, further comprising a protective layer having a first planar surface that coincides with the rectangular plane.

9. The apparatus as recited in claim 8, wherein the array of prisms is integrally formed in the protective layer.

10. The apparatus as recited in claim 6, wherein the gap is at least approximately equal to a width of the first prism and the second prism of the array of prisms.

11. The apparatus as recited in claim 5, wherein at least one prism of the array of prisms is a polyhedron prism, the polyhedron prism configured to refract light through a first portion at a first predetermined angle and through a second portion at a second predetermined angle.

12. The apparatus as recited in claim 5, wherein at least one prism of the array of prisms is a concave prism that include a hypotenuse having a curved surface.

13. The apparatus as recited in claim 5, wherein the array of prisms is further arranged as a first row along a third outer edge of the rectangular plane and arranged as a second row along a fourth outer edge of the rectangular plane.

14. The apparatus as recited in claim 5, wherein the FOV extender further comprises a frame, and wherein prisms of the array of prisms are coupled to an inner portion of the frame, the frame including an aperture that enables light to pass unaltered through the aperture of the frame and onto the image sensor.

15. A device comprising:
   a housing;
   an image sensor coupled to the housing;
   a lens coupled to the housing and aligned with the image sensor to direct light from a first angle of view onto the image sensor; and
   an array of prisms on a rectangular plane to refract light from a second angle of view that is greater than the first angle of view, the prisms to direct light into the rectangular plane and onto portions of an image sensor proximate to a perimeter of the image sensor, the array of prisms including at least a first column of prisms to direct light towards a first side of the image sensor and a second column of prisms to direct light towards a second side of the image sensor, and
   at least a first surface of the first prism and a second surface of the second prism are parallel to the rectangular plane.

16. The device as recited in claim 15, wherein adjacent prisms of the array of prisms are spaced apart by a corresponding gap.

17. The device as recited in claim 15, wherein the array of prisms is located between the image sensor and the lens.

18. The device as recited in claim 15, wherein the array of prisms is located proximate to a first side of the lens that is opposite a second side of the lens, the second side being adjacent to the image sensor.

19. The device as recited in claim 15, further comprising a protective layer coupled to the housing, the protective layer located proximate to a first side of the lens that is opposite a second side of the lens, the second side being adjacent to the image sensor, and wherein the array of prisms is located proximate to the protective layer.

20. The device as recited in claim 15, further comprising a protective layer coupled to the housing, the protective layer located proximate to a first side of the lens that is opposite a second side of the lens, the second side being adjacent to the image sensor, and wherein array of prisms is integrally formed in the protective layer.

\* \* \* \* \*